Figures 1, 2:
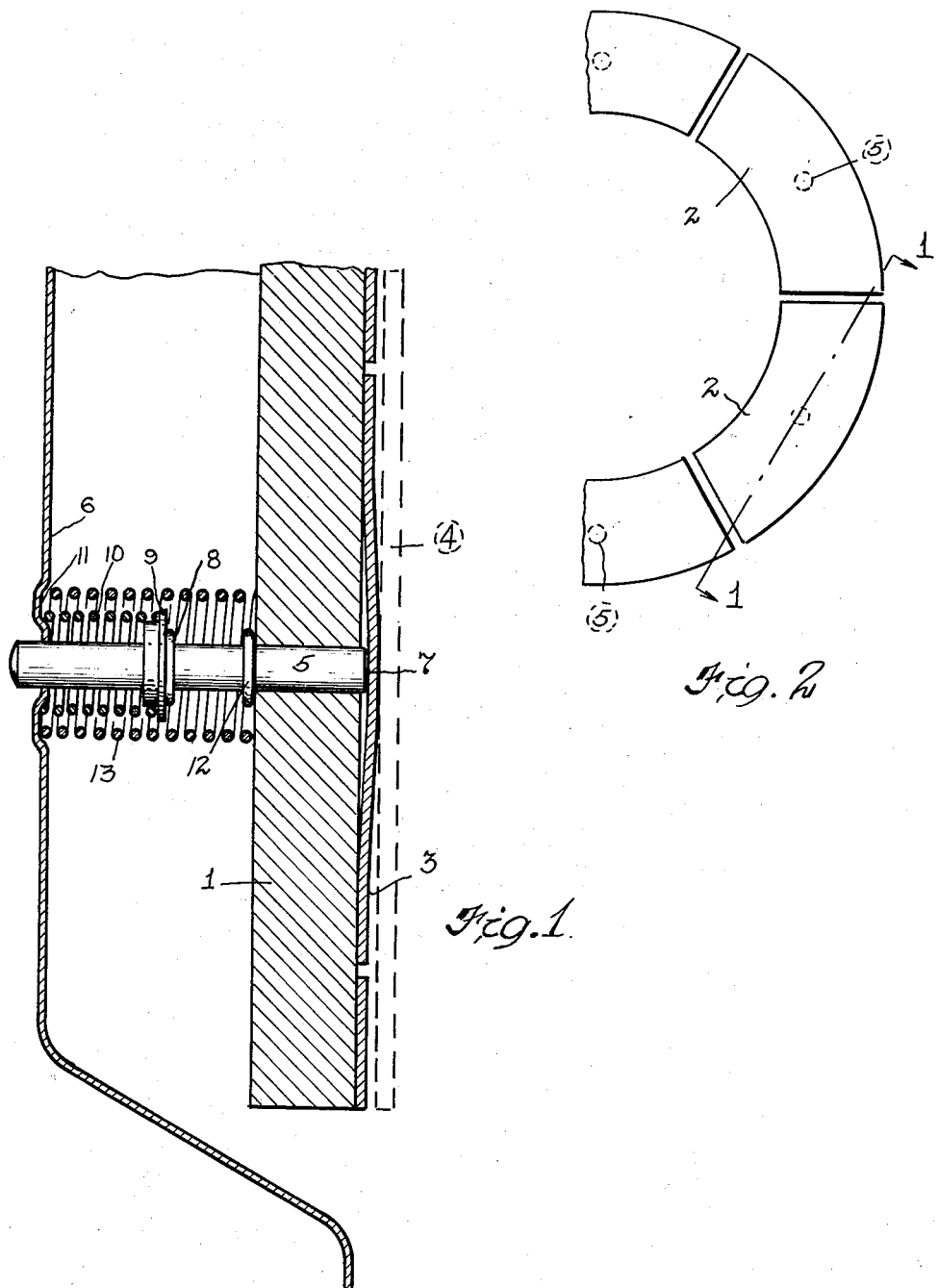

Sept. 12, 1939.   H. W. FIES   2,172,503
CLUTCH
Filed Feb. 15, 1937

INVENTOR.
Herbert W. Fies
BY Fay, Oberlin & Fay
ATTORNEYS.

Patented Sept. 12, 1939

2,172,503

UNITED STATES PATENT OFFICE 2,172,503

CLUTCH

Herbert W. Fies, Cleveland Heights, Ohio, assignor to The Cleveland Graphite Bronze Company, Cleveland, Ohio, a corporation of Ohio Application February 15, 1937, Serial No. 125,741

7 Claims. (Cl. 192—52)

The present invention relates to a novel and improved construction for a clutch particularly adapted for use with internal combustion engines. The improvement embodied in the present invention is to be incorporated in that type of clutch assembly, such as described in co-pending application Serial No. 126,365, filed February 18, 1937, in the name of John V. O. Palm, wherein the friction facing material is carried by the driving elements of the clutch, such as the pressure plate and flywheel, instead of being mounted on the driven element such as the clutch disc.

Since it is desirable to provide a cushioning effect between the engaging surface of the driving and driven elements of a clutch, it is the general object and nature of my present invention to provide means for imparting such a cushioning action to the friction facing carried by the driving elements such as the pressure plate or flywheel. A further object of the invention is to so design such cushioning means so that heat generated through frictional engagement of the friction facing material will not be transmitted to a resilient element such as a spring. By reason of this prevention of the transmission of heat to the spring elements, the life and efficient operation of the latter are to be protected and prolonged.

To the accomplishment of the foregoing and related ends, said invention, then, consists of the means hereinafter fully described and particularly pointed out in the claims.

The annexed drawing and the following description set forth in detail certain structure embodying the invention, such disclosed means constituting, however, but one of various structural forms in which the principle of the invention may be used.

In said annexed drawing:

Fig. 1 is an enlarged, fragmentary, sectional view of a portion of a clutch pressure plate and cover plate showing the cushioning means embodying the principle of my invention, and such view is taken substantially along the line 1—1 of Fig. 2; and Fig. 2 is a fragmentary plan view of the engaging faces of the friction facings.

Now referring more particularly to the drawing, there is shown therein a clutch pressure plate 1 carrying a series of sector-shaped friction facings 2. The material of the friction facings 2 may be of a non-metallic material, but preferably is composed of a metallic material having a relatively high coefficient of friction. The friction facings 2 are normally in contact with the pressure plate 1 at their end portion such as indicated by the numeral 3, and have their intermediate portions normally spaced from the pressure plate changed as will be seen in Fig. 1. The friction facings 2 are adapted to make engagement with the clutch disc such as indicated at 4, upon axial movement of the pressure plate 1.

A series of plungers 5 (only one of which is shown in detail) extend through the pressure plate 1 at a point opposite the central portion of the facings 2, and have their other ends extending through an opening in the cover plate 6. One end of the plunger 5 is adapted to contact with the friction facing 2 as indicated at 7. The friction facing 2 can be permanently attached either to the pressure plate 1 at the end portions 3 of the former, or attached to the plunger 5 at the point 7. Appropriate means of attachment consists of welding or fusing the metallic friction facings 2 to the parts noted.

A collar 8 on the plunger 5 serves as an abutment or stop for holding the washer 9. A coil spring 10 is mounted between the washer 9 and the cover plate 6. The end of the coil spring 10 is adapted to fit in an annular groove 11 stamped into the cover plate 6. A second collar 12 is located on the plunger 5 at a point adjacent the face of the pressure plate 1, the collar 12 serving as a stop for limiting the movement of the plunger 5 with respect to the pressure plate 1 in a right hand direction with respect to Fig. 1.

Main springs 13 (only one of which is shown) are positioned between the pressure plate 1 and the cover plate 6. One end of the main spring 13 fits in the annular groove 11. The main springs 13 are adapted to urge the pressure plate in an axial direction toward the clutch disc 4, and during engagement of the latter elements, the friction facings 2 are flattened against the pressure plate 1 and force the cushioning plungers 5 in a left hand direction against the pressure of the springs 10.

It will thus be seen that heat generated in the friction facings 2, the majority of which is transmitted to the pressure plate 1, is prevented in turn from being transmitted to the cushioning springs 10 since the latter are out of contact with the pressure plate 1. In this manner the cushion springs 10 are enabled to retain their spring action and to thus have a long and effective life.

Other modes of applying the principle of my invention may be employed instead of the one explained, change being made as regards the structure herein disclosed, provided the means stated by any of the following claims or the equivalent of such stated means be employed.

I therefore particularly point out and distinctly claim as my invention:

1. In a clutch, the combination of a driving member, a friction facing carried by said driving member, plungers extending through said driving member and having their ends adapted to bear against said facing to urge the latter away from said driving member, and spring means coaxial with said plungers for loading said plungers, said spring means being out of contact with said driving member.

2. In a clutch, the combination of a driving member, a friction facing carried by said driving member, plungers extending through said driving member and having their ends adapted to bear against said facing to urge the latter away from said driving member, spring means for loading said plungers, said spring means being out of contact with said driving member, and stop means adapted to bear directly on said driving member for limiting the movement of said plungers.

3. In a clutch, the combination of a pressure plate, sector shaped friction facings attached adjacent their end portions to said pressure plate and having their intermediate portions free thereof, and spring loaded plungers extending through said pressure plate and contacting with the intermediate portions of said facings for urging only the latter away from said pressure plate.

4. In a clutch, the combination of a pressure plate, sector shaped friction facings attached adjacent their end portions to said pressure plate and having their intermediate portions free thereof, plungers extending through said pressure plate and contacting with the intermediate portions of said facings for urging only the latter away from said pressure plate, and spring means for loading said plungers, said spring means being out of contact with said pressure plate.

5. In a clutch, the combination of a pressure plate, sector shaped friction facings carried by said pressure plate, a cover plate spaced from said pressure plate, plungers extending through openings in said pressure plate and in said cover plate respectively, one end of each of said plungers being adapted to bear against said facings and urge the latter away from said pressure plate, and springs biasing said plungers in the direction of said pressure plate, said springs bearing at one end against said cover plate.

6. In a clutch, the combination of a driving member, friction facings in engagement with said driving member, and means for urging portions of said facings away from said driving member, said means comprising plungers extending through said driving member and springs coaxial with said plungers, but out of contact with said driving member.

7. In a clutch, the combination of a driving member, a friction facing carried by said driving member, and extending in a plane transverse to the axis of said driving member, spring loaded plungers extending through said driving member and having their ends adapted to bear against said facing to urge the latter away from said driving member, and stop means adapted to bear directly against said driving member for limiting the movement of said plungers.

HERBERT W. FIES.